Oct. 14, 1924.

P. SEITZ ET AL

1,511,527

WEIGHING MACHINE WITH AUTOMATIC INDICATING OR PRINTING DEVICE

Filed June 1, 1922    2 Sheets—Sheet 1

INVENTORS
Paul Seitz
A. Krämer
BY Wm Wallace White
ATTY.

Oct. 14, 1924.                                                  1,511,527
P. SEITZ ET AL
WEIGHING MACHINE WITH AUTOMATIC INDICATING OR PRINTING DEVICE
Filed June 1, 1922        2 Sheets-Sheet 2
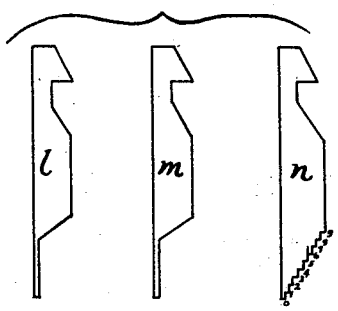
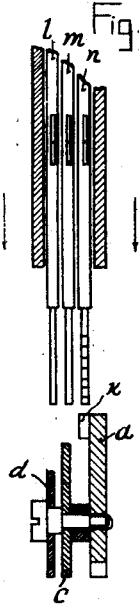
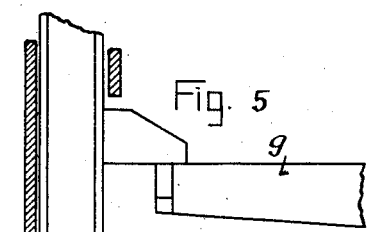
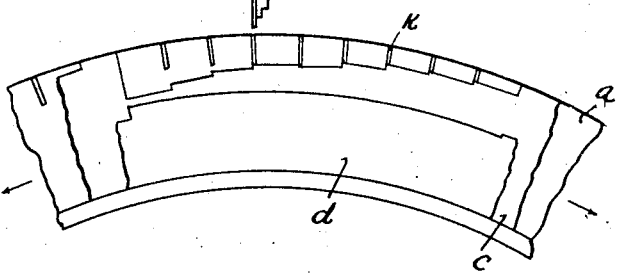
INVENTORS
PAUL SEITZ
A. KRAMER
BY
Wm. Wallace White
ATTORNEY Patented Oct. 14, 1924.

1,511,527

UNITED STATES PATENT OFFICE.

PAUL SEITZ AND A. KRÄMER, OF KREUZNACH, GERMANY.

WEIGHING MACHINE WITH AUTOMATIC INDICATING OR PRINTING DEVICE.

Application filed June 1, 1922. Serial No. 565,247.

*To all whom it may concern:*

Be it known that we, PAUL SEITZ and A. KRÄMER, both citizens of Germany, residing at Kreuznach, Germany, have invented certain new and useful Improvements in Weighing Machines with Automatic Indicating or Printing Devices, of which the following is a specification.

This invention relates to weighing machines having an automatic indicating or printing device which is arranged independently of the setting device for the weighing machine and is only set in operation after the setting of the weighing machine has been effected by the insertion of a coin or other manipulation. In the known weighing machines of this character the setting device of the weighing machine is braked as soon as it has oscillated into the weighing position and then turns a typewheel in accordance with the setting device, mostly by complicated mechanism, whereupon the printing device is brought into operation. By the present invention the transmission of the movement to the indicating or printing device is considerably simplified and thus the weighing machine is rendered more certain in operation and caused to operate more rapidly.

According to the invention the setting device for the weighing machine comprises a pivoted sector adapted to be moved about its pivot into different positions according to the load weighed, and this sector comprises a number of concentrically arranged segments which are graduated on their peripheral edges according to different denominations of weight, for example three segments may be used graduated according to units and fractions thereof, tens and hundreds of units of weight respectively.

Each segment co-operates with a corresponding movable key and the keys control the indicating or printing device. When the keys are moved into engagement with their segments their positions are adjusted in the paths of and relatively to the numeral or type wheels or sectors of the printing device so that the adjustments or movements of these wheels or sectors into their indicating or printing positions are determined by the keys. The graduations on the segments may be in the form of steps and it is preferred to provide the segments for the tens and hundreds with graduations of such form, but for the units or fractions thereof it is preferred to provide the steps on the corresponding key and to provide the units segment with equally spaced projections.

The invention also comprises mechanism for releasing the keys, and for operating the indicating and printing device after the setting of the keys.

In the drawings:

Figure 2 is a side elevation of the numeral or type wheels or sectors.

Figure 3 shows the three keys detached and in side view.

Figs. 4 and 5 are vertical sectional views taken at right angles to each other, Fig. 4 showing the segments $a$, $c$ and $d$ in section.

Figure 1:
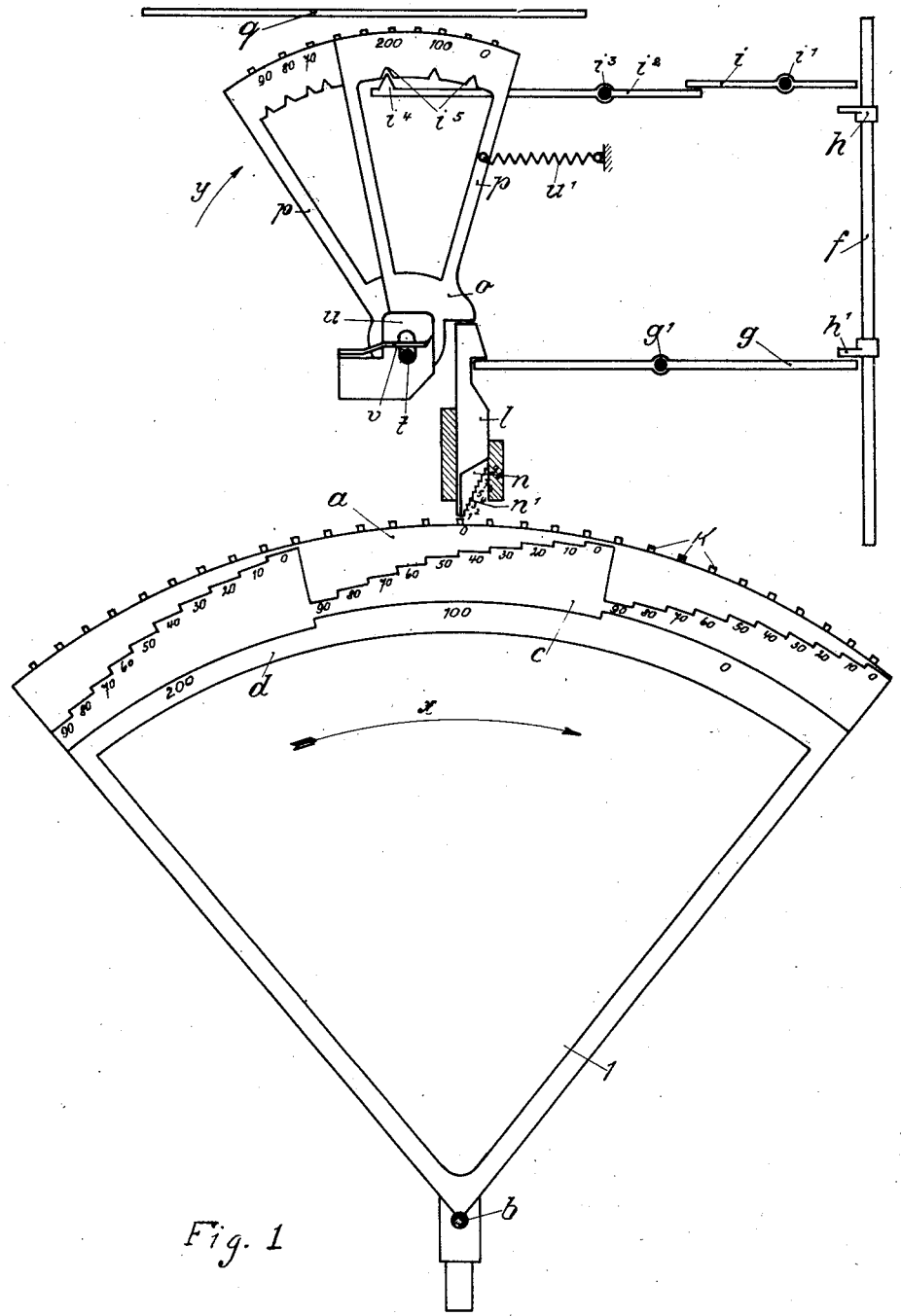
Figure 1 is a front elevation of one form of automatic printing device for a weighing machine, and its controlling mechanism, according to the invention.

In the form of the invention illustrated a sector 1 is rotatably mounted on an arbor $b$. It is operatively connected to the foot-board or weighing platform by the weighing mechanism in such a manner well known in the art that when the foot-board is loaded it moves about the arbor $b$ into the weighing position, for example in the direction of the arrow $x$ in Figure 1. The right hand end of the sector corresponds to the zero load, whilst the left hand end corresponds to the maximum load.

The sector 1 has three concentric segments $a$, $c$, $d$. The peripheral edge of the segment $a$ is graduated by equally spaced projections $k$, corresponding to unit denominations. The peripheral edge of the segment $c$ is graduated by steps corresponding to tens of units denominations. The peripheral edge of the segment $d$ is graduated by steps corresponding to hundreds of units of weight denominations.

After the sector $a$ has been moved or set by the load in the weighing position, entirely independently of the indicating or printing device, a vertically guided rod $f$ is raised. The rod $f$ may be operated manually or by coin freed mechanism of any suitable type well known in the art.

When this occurs a tappet $h'$ on the rod $f$ releases three keys $l$, $m$, and $n$, through the medium of intermediate levers $g$, pivoted at $g'$, so that the keys are free to move downwardly under the action of springs $u'$ and bear with their lower ends respectively on the segments $a$, $c$, and $d$. The key $n$, shown right at the back in Figure 1, which corresponds to the first decimal position (the units), is itself provided with graduated steps $n'$, by means of which it bears upon one of the tooth-like rearwardly extending projections $k$.

Three type sectors $p$ are pivoted on a pin $t$ held in a slotted bearing $u$ by springs $v$ only one of which is to be seen in Figure 1. The type sectors are free to oscillate on said pin $t$, and are also capable of slight upward movement towards a printing platen $q$, against the action of the springs $v$. The type sectors are moved into their selected printing positions in the direction of the arrow $y$, Figure 1, under the action of springs $u'$ or their equivalents. The keys $l, m, n$, are situated in the paths of the type sectors $p$ which have projections $o$ for engagement with the upper ends of the keys. The keys therefore determine the printing or indicating positions of the type sectors. Thus, after the keys $l, m, n$, have been released and have engaged with the sector $a$ and segments $c, d$, the type sectors $p$ follow the movements of the keys and are thus set to the position for printing.

As soon as this has occurred the tappet $h$ on the rod $f$, strikes a lever $i$ which is pivoted at $i'$. The lever $i$ in turn depresses the adjacent end of a lever $i^2$ pivoted at $i^3$ and having a tooth $i^4$ which engages in notches $i^5$ in the type sectors $p$ so that the latter are raised against the action of the springs $v$ towards the platen or carrier $q$ and against the weighing card, delivered by the platen or carrier $q$, so as to print thereon the weight of the load. The type sectors are then released for the next weighing operation.

The invention, is not applicable solely to weighing machines for people, but can also be applied to weighing machines for other purposes, such as for weighing parcels and the like. The insertion of a coin, which operates the rod $f$ and thus the keys $l, m, n$, and the printing device may be replaced by a suitable crank or the like. The invention is also applicable to weighing machines, which do not print, but which indicate the weight, the type sectors $p$ being then merely indicators and the platen $q$ being omitted.

The weighing machine can also be arranged for weighing operations which do not follow the decimal system. Further, also, the key $n$ may be graduated for fractions of whole units of weight.

We claim:

1. Indicating or printing mechanism for a weighing machine, comprising an oscillatory sector having a plurality of segments, said segments being graduated according to different denominations of weight, a plurality of movable indicating or printing elements, a plurality of keys, means for moving said keys into engagement with said sector and segments after said sector has been moved by the load to be weighed, and means for moving said indicating or printing elements into engagement with said keys, while the latter are in engagement with said sector and segments, for the purpose of determining the indicating or printing position of said elements.

2. Indicating or printing mechanism for a weighing machine, comprising an oscillatory sector having one segment provided with projections graduated according to units of weight, two segments on said sector having steps graduated respectively according to tens, and hundreds of units of weight, a movable key graduated in steps according to fractions of units of weight and adapted to engage with the projections on said units segment, other movable keys adapted to engage with the steps on said tens and hundreds segments, and a movable indicating or printing element corresponding to each key and adapted to be controlled in its movements by said key, substantially as and for the purpose hereinbefore set forth.

3. Printing mechanism for a weighing machine, comprising an oscillatory sector having a plurality of segments, said segments being graduated according to different denominations of weight, a set of movable printing elements, a set of movable keys for arresting and thereby determining the printing positions of said printing elements, means for moving said keys into engagement with the said segments, after said sector has been moved by the load to be weighed, for the purpose of adjusting the positions of said keys relatively to said printing elements, a printing platen, and means for moving said printing elements, relatively to said platen after they have been arrested by said keys, substantially as and for the purpose hereinbefore set forth.

In testimony whereof we have signed our names to this specification in the presence of two subscribing witnesses.

PAUL SEITZ.
A. KRÄMER.

Witnesses:
T. H. ANDERSON,
MORRISON TAYLOR.